UNITED STATES PATENT OFFICE.

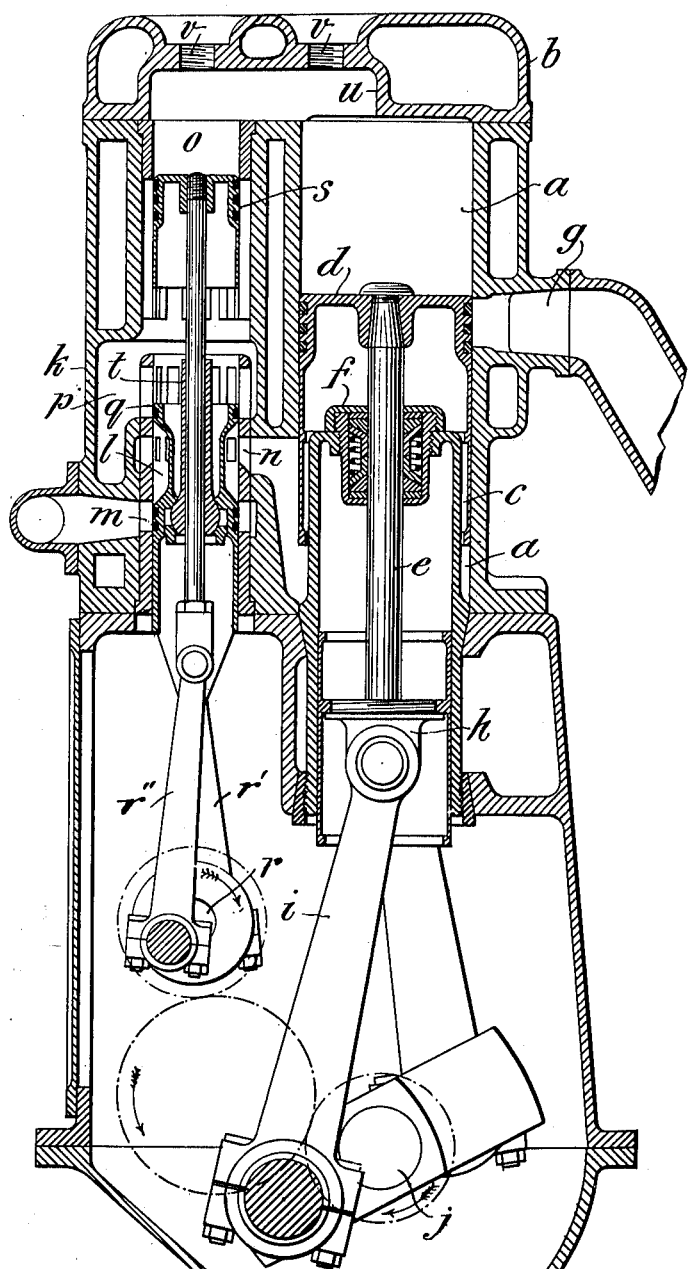

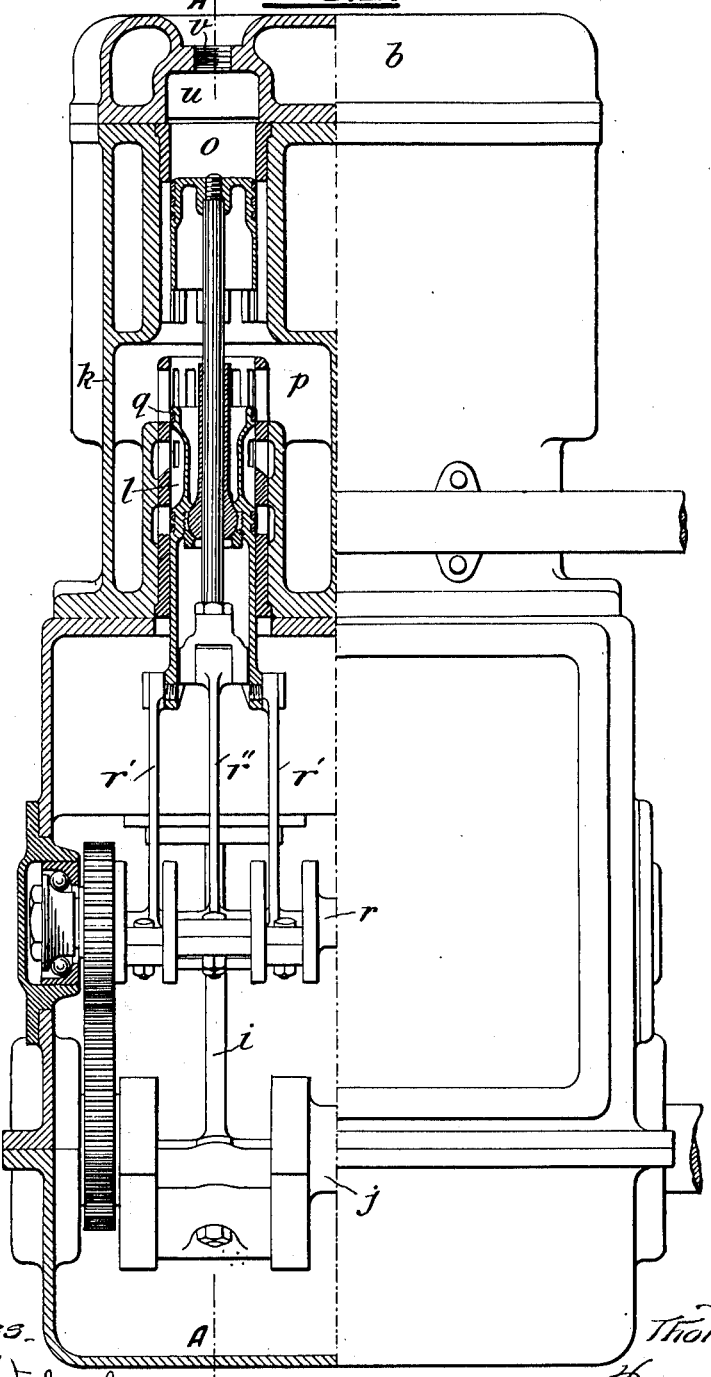

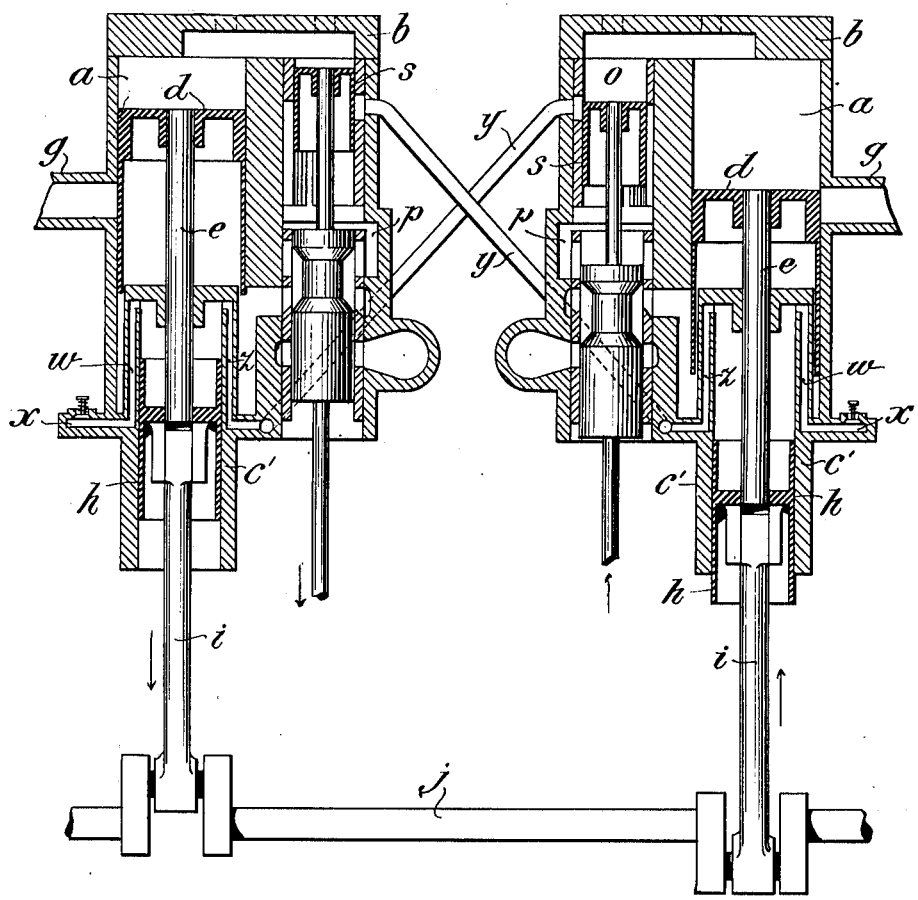

THOMAS COOPER, OF KINGS LYNN, NORFOLK, ENGLAND.

INTERNAL-COMBUSTION ENGINE.

955,767.  Specification of Letters Patent.  Patented Apr. 19, 1910.

Application filed January 22, 1910. Serial No. 539,618.

*To all whom it may concern:*

Be it known that I, THOMAS COOPER, of The Elms, Kings Lynn, Norfolk, England, engineer, have invented certain new and useful Improvements in Internal-Combustion Engines, of which the following is a specification.

The present invention has reference to two cycle internal combustion engines of the kind wherein explosive mixture is drawn from the carbureter into what may be called the pump end of the cylinder by the backward stroke of the piston and then forced by the forward stroke into a reservoir whence it passes into the cylinder at the explosion end. In engines of this description it is important not only to suck a full charge from the carbureter but to insure that a full charge reaches in due course the explosion end of the cylinder. It is therefore essential to avoid the use of unduly long passages for the charge or of valves which are likely to retard or in any way interfere with, the progress of the said charge on its way to the cylinder. It is also an advantage to clear the cylinder from the exploded charge before the admission of a fresh one so as to avoid contamination of the latter by the former.

According to my invention I employ an arrangement which is extremely compact and works very efficiently. The reservoir is alongside its cylinder and in the same casting. A pair of mechanically operated independent slide valves is employed. One of them controls the admission of the explosive mixture to the pump and the discharge of the same from the pump to the reservoir and the other valve controls the outlet of the reservoir and, when a fresh air scavenging device is employed, the admission of air to the cylinder in advance of the charge and immediately following the explosion. The passages in my arrangement are short and direct due to the position of the reservoir and of the valves which project into the latter.

In the accompanying drawings I have shown a two cylinder internal combustion engine working on the two stroke principle embodying my invention.

Figure 1 is a vertical section on the line A—A of Fig. 2. Fig. 2 is a vertical section through one cylinder on a line taken at right angles to Fig. 1. Fig. 3 is a sectional view of a modification showing the cylinder trunks and connections for reciprocal scavenging by outside air when the units are set up in pairs.

$a$, Figs. 1 and 2, is a cylinder closed at the top by a cover $b$ and at the bottom by a trunk $c$.

$d$ is a piston working in the cylinder $a$ and having a rod $e$ passing through a stuffing box $f$ in the head of the trunk $c$.

$g$ is the exhaust port of the cylinder $a$ which is alternately opened and closed by the piston $d$.

The piston rod $e$ is connected to a crosshead $h$ which is adapted to slide within the trunk $c$.

The cylinder $a$ is divided by the piston into an upper explosion chamber and a lower pumping chamber.

The cross head $h$ is connected by an ordinary pitman $i$ to the crank shaft $j$.

At the side of the cylinder $a$ is a casing or valve chest $k$ divided into three separate compartments by two piston valves.

The compartment $l$ communicates by the port $m$ with the carbureter (not shown) and with the interior of the cylinder $a$ below the exhaust, through the port $n$. The compartment $o$ is open to the explosion end of the cylinder $a$ and between the compartments $l$ and $o$ is the compartment $p$ which I call a compression chamber. The ports $m$ and $n$ and also the inlet to the compression chamber $p$ are controlled by the piston valve $q$ which is connected by pitman $r'$ to a crank shaft $r$ provided with suitable gearing meshing with gearing on the engine crank shaft $j$. The outlet from the chamber $p$ leading to the explosion end of the cylinder $a$ is controlled by the piston valve $s$ which is also connected to the crank shaft $j$. In the arrangement shown the valves are arranged tandemwise and the rod of the piston valve $s$ passes loosely through a sleeve $t$ fitted to the piston valve $q$ and adapted to rock slightly therein without permitting the passage of explosive mixture therethrough, the said rod being connected to a pitman $r''$ set on shaft $r$ at an angle of 90° to pitman $r'$.

In operation the piston $d$ on the backward stroke draws explosive mixture from the carbureter through the compartment $l$ into the cylinder $a$ at the forward end by the port $n$, the carbureter passage $m$ being by the position of the valve $q$ at this time open and the inlet to the compression chamber *p* closed. On the forward stroke the carbureter passage *m* is closed and the inlet to the compression chamber *p* is open so that the contents of the cylinder at the forward end are compressed through the port *n* into the compression chamber *p* aforesaid. The outlet of the compression chamber *p* leading to the cylinder *a* at the explosion side of the piston *d* is also closed at the time of the explosion but opens when the piston reaches a suitable point on the exhaust port *g*. At this point the scavenging takes place when the cylinders are coupled up as shown in Fig. 3, which is followed by an inrush of explosive mixture to the explosion side of the piston and the said mixture is fully compressed in the cylinder by the piston in making its instroke.

To facilitate the spreading of the explosive mixture within the cylinder *a* I form the cover *b* with a wall or deflecting surface *u* which will cause the gas to diffuse over the whole area of the piston and drive out the spent charge. Any desired number of cylinders may be associated together in an engine.

The holes *v* in the cover *b* are intended to receive sparking plugs.

Proceeding now to a description of the means for scavenging the cylinders with clean air as shown by the modification illustrated in Fig. 3 it will be seen that the crosshead *h* is in the form of a piston working in the trunk *c'* so as to form therewith an air pump. The drawing shows a duplex arrangement of cylinders and valves placed side by side. The arrangement is such that the air compressed in the trunk of the right hand cylinder is used for scavenging the left hand cylinder and vice versa. If there are more than two cylinders the same series arrangement may be employed. Air is admitted to the trunk *c'* near the top through a passage *w* in the wall thereof communicating by the passage *x* with the open air through an ordinary intake valve. The air leaves the trunk *c'* for the box of the valves of the companion cylinder by means of a pipe *y* communicating with the said trunk by a passage *z* in the wall thereof.

The timing of the valve *s* in connection with its cylinder, and the position of the air port in the box of said valve must be such that the discharge of air from the pump of the other unit follows the explosion in the cylinder in connection with said valve *s*, and the opening of the exhaust for the escape of the scavenging air precedes the opening of the port by the valve *s* for the admission of the next explosive charge. The valve *s* moves downward to admit the scavenging charge and the explosive mixture and the port for the former is placed slightly higher than the inlet for the latter. The seating of the valve *s* is made solid on the side which contains the air port but is gridlike on the opposite side.

In Fig. 3; the piston of the left-hand cylinder is on its downward stroke following the explosion and will shortly uncover the exhaust port *g*. The valve *s* will shortly open the port for admitting the scavenging charge, previously sucked into the pump of the other unit and compressed, which will clear out the exploded gases in the said left-hand cylinder before the exhaust *g* therefrom is again closed by the rising of said left-hand piston. Simultaneously the charge of scavenging air is being sucked into the trunk *c'* of the same cylinder to be subsequently compressed and expelled into the companion cylinder shown on the right of Fig. 3 which has its piston rising and just covering its exhaust.

I may here remark that as the head of the piston valve *s* is exposed to the force of the explosion the latter can be utilized for driving directly the said valve and also the valve *q* associated therewith.

What I claim as my invention, and desire to secure by Letters Patent is:—

1. A two-cycle internal combustion engine, comprising a cylinder, a piston reciprocating therein and dividing the cylinder into a pumping chamber at one end and an explosion chamber at the other end, a charge inlet leading to the pumping chamber, a compression chamber located along side the cylinder, a slide-valve arranged to project into the compression chamber to control the admission of the explosive mixture from the pumping chamber to the compression chamber on the downward stroke of the piston, said valve serving also to control the admission of the charge from the inlet to the pumping chamber on the upward stroke of the piston, a passage leading from the compression chamber to the explosion chamber, and a reciprocating piston-valve controlling the passage from the compression chamber to the explosion chamber.

2. In an internal combustion engine, a pair of engine units, each having a cylinder with an explosion chamber in one end thereof, a piston operating therein and adapted to compress the charge in the other end thereof, an air pump operated by the piston, a valve-chest having a passage in communication with the explosion end of the cylinder, a passage to receive the compressed charge, and a charge-receiving inlet, a pair of piston valves, one controlling the first-named passage and the other the last-named passage and inlet, and conduits each leading from an air pump of one of the units aforesaid to the passage leading to the explosion chamber of the other unit and controlled by the piston valve therefor.

3. In an internal combustion engine, a pair of engine units, each having a cylinder, a piston operating therein and dividing the cylinder into a pumping chamber at one end and an explosion chamber at the other end, a valve-chest having a compression chamber to receive the compressed charge from the pumping chamber, a passage leading from the compression chamber to the explosion end of the cylinder, a passage leading from the valve-chest to the pumping chamber, and a charge-receiving inlet, a pair of piston valves, one controlling the first-named passage and the other arranged to control communication between the pumping chamber and the inlet, and compression chamber, respectively, each engine unit having an air pump operated by the piston, and conduits each leading from an air pump of one of the units aforesaid to the passage leading to the explosion chamber of the other unit and controlled by the piston valve therefor.

THOMAS COOPER.

Witnesses:
A. A. ANDERSON,
P. RABY.